United States Patent
Belstner et al.

(10) Patent No.: US 10,152,617 B2
(45) Date of Patent: Dec. 11, 2018

(54) METHODS, SYSTEMS AND APPARATUS TO IMPROVE RADIO FREQUENCY IDENTIFICATION (RFID) TAG COMMUNICATION

(71) Applicant: Intel Corporation, Santa Clara, CA (US)

(72) Inventors: John Belstner, Valley Center, CA (US); Timothy Shockley, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/665,026

(22) Filed: Jul. 31, 2017

(65) Prior Publication Data
US 2018/0032765 A1  Feb. 1, 2018

Related U.S. Application Data

(60) Provisional application No. 62/369,488, filed on Aug. 1, 2016.

(51) Int. Cl.
*G06K 7/10* (2006.01)

(52) U.S. Cl.
CPC ..... *G06K 7/10039* (2013.01); *G06K 7/10297* (2013.01)

(58) Field of Classification Search
CPC ........... G06K 7/10039; G06K 7/10297; G06K 7/10356; G06K 7/10029; G06K 7/10128
See application file for complete search history.

(56) References Cited

U.S. PATENT DOCUMENTS

| | | |
|---|---|---|
| 6,590,834 B1 | 7/2003 | Highfill |
| 8,321,303 B1 | 11/2012 | Krishnamurthy et al. |
| 9,672,396 B1 | 6/2017 | Bookman |
| 2006/0022801 A1* | 2/2006 | Husak ................ G06K 7/0008 340/10.5 |

(Continued)

OTHER PUBLICATIONS

International Searching Authority, "International Search Report & Written Opinion", issued in connection with International Patent Application No. PCT/US17/19769, dated Jul. 17, 2017 (19 pages).

(Continued)

*Primary Examiner* — Laura Gudorf
(74) *Attorney, Agent, or Firm* — Hanley, Flight & Zimmerman, LLC.

(57) ABSTRACT

Methods, systems, apparatus, and articles of manufacture are disclosed to improve radio frequency identification (RFID) tag communication. An example disclosed apparatus includes an RFID reader monitor to activate a first RFID reader and deactivate a second RFID reader during a first tag data acquisition at a first time, and deactivate the first RFID reader and activate the second RFID reader during a second tag data acquisition at a second time, a tag logger to identify a first set of RFID tags detected by the first RFID reader at the first time, and identify a second set of RFID tags detected by the second RFID reader at the second time, and a group generator to improve RFID tag communication by identifying which one of the first RFID reader and the second RFID reader communicates with a common RFID tag.

25 Claims, 9 Drawing Sheets

(56) References Cited

U.S. PATENT DOCUMENTS

| | | | |
|---|---|---|---|
| 2006/0175407 A1* | 8/2006 | Kinoshita | G06K 7/0008 |
| | | | 235/451 |
| 2007/0046432 A1 | 3/2007 | Aiouaz et al. | |
| 2007/0236352 A1 | 10/2007 | Allen, Jr. et al. | |
| 2008/0129485 A1* | 6/2008 | Tuttle | G06K 7/0008 |
| | | | 340/539.11 |
| 2009/0045955 A1 | 2/2009 | Ulrich | |
| 2009/0102675 A1* | 4/2009 | Arteaga | H04L 67/322 |
| | | | 340/670 |
| 2009/0221301 A1 | 9/2009 | Riley et al. | |
| 2010/0176926 A1 | 7/2010 | Jo et al. | |
| 2012/0313757 A1 | 12/2012 | Volpi et al. | |
| 2014/0253293 A1 | 9/2014 | Sadr | |
| 2015/0269818 A1 | 9/2015 | Jain et al. | |

OTHER PUBLICATIONS

United States Patent and Trademark Office, "Non-Final Office Action," issued in connection with U.S. Appl. No. 15/443,500, dated Oct. 6, 2017, 13 pages.

United States Patent and Trademark Office, "First Action Interview Pilot Program Pre-Interview Communication" issued in connection with U.S. Appl. No. 15/443,526, dated Apr. 4, 2018, 6 pages.

United States Patent and Trademark Office, "Notice of Allowance" issued in connection with U.S. Appl. No. 15/443,526, dated Jun. 25, 2018, 14 pages.

United States Patent and Trademark Office, "Notice of Allowance" issued in connection with U.S. Appl. No. 15/443,500, dated May 11, 2018, 9 pages.

* cited by examiner

250

|   | RFID Reader 1 | RFID Reader 2 | RFID Reader 3 | RFID Reader 4 |
|---|---|---|---|---|
| A | √ | | | |
| B | √ | √ | | |
| C | √ | | | |
| D | √ | √ | | |
| E | √ | √ | | |
| F | | √ | | |
| G | √ | √ | | |
| H | | √ | | |
| I | | | √ | |
| J | | | √ | √ |
| K | | | √ | |
| L | | | √ | √ |
| M | | | √ | √ |
| N | | | | √ |
| O | | | √ | √ |
| P | | | | √ |

FIG. 2B

METHODS, SYSTEMS AND APPARATUS TO IMPROVE RADIO FREQUENCY IDENTIFICATION (RFID) TAG COMMUNICATION

RELATED APPLICATION

This patent arises from an application that claims the benefit of U.S. Provisional Patent Application Ser. No. 62/369,488, entitled "Autonomous Algorithms to Control a Network of RFID Readers for Optimized Asset Tracking and Inventory Management," which was filed on Aug. 1, 2016. U.S. Provisional Patent Application Ser. No. 62/369,488 is hereby incorporated herein by reference in its entirety.

FIELD OF THE DISCLOSURE

This disclosure relates generally to communication improvement in radio frequency identification (RFID) networks, and, more particularly, to methods, systems and apparatus to improve RFID tag communication.

BACKGROUND

In recent years, radio frequency identification (RFID) systems have been used to collect data in a cost-judicious manner. RFID systems typically include an RFID reader having a power source to generate radio frequency (RF) energy in a modulated or unmodulated manner that is transmitted to one or more RFID tag devices. The RFID tag devices typically consume a relatively small physical footprint such that they may be attached to objects (e.g., retail products, library books, office files, etc.). The RFID tags contain no internal power source and, instead, are energized by RF energy received from a corresponding RFID reader.

BRIEF DESCRIPTION OF THE DRAWINGS

FIG. 2B is an example reader/tag table generated by the example RFID system of FIG. 1.

Figure 1:
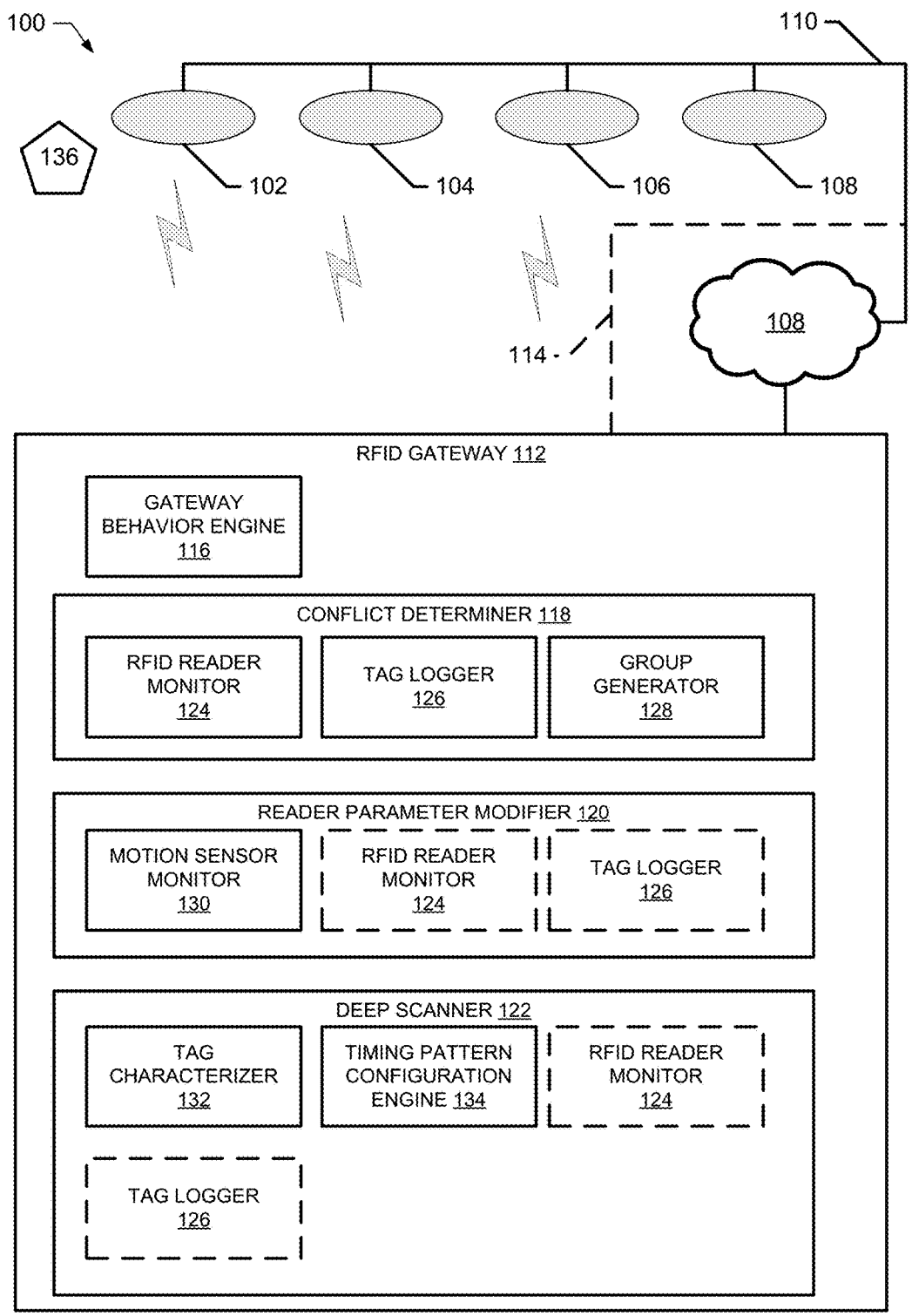
FIG. 1 is a schematic illustration of an example RFID system constructed in accordance with the teachings of this disclosure to improve RFID tag communications.

The figures are not to scale.

DETAILED DESCRIPTION

Radio frequency identification (RFID) readers (referred to herein as "interrogators," or "readers") transmit radio frequency (RF) energy to passive tag devices, thereby providing the tag devices with sufficient energy to respond to the interrogator. RFID readers typically operate in view of particular configuration parameters that are established and/or otherwise set in view of a particular task and/or environmental conditions. Example configuration parameters include, but are not limited to power level values, dwell time values, retry count values, auto repeat modes, delay time values, modulation techniques/types (e.g., double side band (DSB) amplitude shift keying (ASK), phase reversal-ASK, etc.), link frequency values, and data transfer rate values. In some examples, the configuration parameters are set to a first profile to accommodate relatively low tag density environments in which a scan rate is set higher than that for relatively higher tag density environments, which may include a second profile to scan at a relatively lower scan rate.

In the event configuration parameters are to be tailored and/or otherwise selected as a first profile, a second profile, etc., RFID system personnel must evaluate the environment in which the readers and tags are to be used, identify potential interference and/or overlap conditions, and configure the one or more readers with configuration parameters to optimize performance. However, even after RFID personnel configure the one or more readers with configuration parameters for a first mode of operation (operating mode) (e.g., a high scan rate for a low-density application), in the event of environmental changes (e.g., an increase in tag density of a particular location), the RFID personnel must re-configure the one or more readers with alternate configuration parameters.

In some examples, such as retail environments, several readers are required to cover a floor space having goods/products with RFID tags attached. When product density increases, in which each product includes a corresponding RFID tag, the possibility of RF interference also increases. Additionally, in such relatively high-density areas, some RFID tags may reside underneath layers and/or stacks of other products, thereby making RFID communication less reliable and/or successful for those products at a farther proximity to the readers(s) (e.g., ceiling mounted readers/interrogators) as compared to those products relatively closer to the readers(s). As such, in the event the configuration parameters are set to exhibit a relatively fast scan rate, then those products buried under obstructions, such as stacks of other products, may not be detected by the reader. Still further, in example retail environments where products may be moving to other locations of the retail floor (e.g., moving from a shelf to a shopping cart, moving in the shopping cart to another area of the store, carried from the store shelf to a register, etc.), relatively higher scan rates may be applied in an effort to identify which products are popular and/or otherwise selling well. The relatively higher scan rates are more likely to identify the products in motion because they are no longer buried under stacks of other product and will respond to RF energy from the reader with less delay due to the relatively closer proximity to the readers(s) (e.g., ceiling mounted interrogators).

Examples disclosed herein configure and manage RFID readers in view of environmental conditions and/or changing conditions of the environment in which RFID tags are to be interrogated (read). Examples disclosed herein identify potential conflicts between two or more readers in an area of interest and establish a scanning routine to reduce and/or otherwise minimize interference during reader/RFID tag communication. Additionally, examples disclosed herein identify circumstances in which motion is occurring in an area of interest, and alter the configuration settings of one or more readers in response to the detection of such motion. Still further, examples disclosed herein improve communication success and/or otherwise reduce communication failures between readers and RFID tags by energizing tags with unmodulated carrier waves (unmodulated RF energy/signals) prior to one or more attempts to read those RFID tags, as described in further detail below.

FIG. 1 is a schematic illustration of an example RFID system 100 including an example first reader 102, an example second reader 104, an example third reader 106, and an example fourth reader communicatively connected to a network 108. While the illustrated example of FIG. 1 includes a first bus 110 to communicatively interconnect the example readers, examples disclosed herein are not limited to physical communication cables and may include wireless communication techniques to connect to the example network 108. The example network 108 may include wired and/or wireless techniques and, in some examples, the one or more readers may be directly connected to an example RFID gateway 112 via the example network 108 and/or directly through a second bus 114.

In the illustrated example of FIG. 1, the RFID gateway 112 includes an example gateway behavior engine 116, an example conflict determiner 118, an example reader parameter modifier 120, and an example deep scanner 122. The example conflict determiner 118 of FIG. 1 includes an example RFID monitor 124, an example tag logger 126 and an example group generator 128. The example reader parameter modifier 120 of FIG. 1 includes an example motion sensor monitor 130, the example RFID reader monitor 124 and the example tag logger 126. The example deep scanner 122 of FIG. 1 includes an example tag characterizer 132, an example timing pattern configuration engine 134, the example RFID reader monitor 124, and the example tag logger 126. The example RFID system 100 also includes an example motion sensor 136 communicatively connected to the example RFID gateway 112 via the example network 108 and/or via the example second bus 114.

In operation, the example gateway behavior engine 116 invokes one or more services of the example RFID system 100 of FIG. 1, such as determining whether a survey of an area of interest to be monitored by one or more readers. In the event a survey of the area of interest is to occur, then the example gateway behavior engine 116 invokes the example conflict determiner 118, as described in further detail below. However, in the event reader/interrogator configuration parameters are to be modified in view of a trigger event (e.g., motion), then the example gateway behavior engine 116 invokes the example reader parameter modifier 120. Still further, in the event tag scanning attempts are to be conducted in an improved manner, such as a deep scan to successfully communicate with one or more tags that may be buried under several layers of obstruction (e.g., layers of products, folded garments, etc.), then the example gateway behavior engine 116 invokes the example deep scanner 122, as described in further detail below.

As used herein, a deep scan includes a manner of RFID interrogation that begins with an energize stage in which the area of interest is targeted with RF energy without corresponding communication or protocol efforts. In other words, the example energize stage includes RF energy as, for example, an unmodulated signal from one or more readers to provide one or more tags with sufficient power to enable successful communication back to the reader. Consider, for example, a stack of clothing in which each item of clothing includes a corresponding RFID tag. When the stack of clothing is interrogated by the example interrogator/reader, the topmost item will likely be the most detectable to a ceiling mounted reader, while the bottom-most item may not be responsive due to RF noise caused by the one or more RFID tags above it. Because RFID tags are designed to go "silent" for a period of time following an interrogation response, a prolonged unmodulated RF signal can penetrate the stack of clothing more successfully as the topmost items respond to an interrogation request and then go silent, thereby reducing RF interference that would otherwise block-out the bottom-most items.

Generally speaking, the initial powering of an RFID tag exhibits the largest degree of communication failure during an interrogation attempt. In particular, if the interrogation commands are transmitted to the target RFID tag prior to that tag receiving adequate RF energy to enable return communications back to the reader, then the interrogation attempt fails. As such, examples disclosed herein establish an energize mode to sufficiently power-up target RFID tags prior to sending one or more instructions and/or protocol communication attempts for return data from the RFID tag(s).

Initial configuration of the example RFID system 100 of FIG. 1 is managed by the example conflict determiner 118. In operation, the example conflict determiner 118 responds to a system configuration request by invoking the example RFID reader monitor 124 to identify available RFID readers/ interrogators. When a list of available RFID readers has been obtained, the example RFID reader monitor 124 selects and activates a first RFID reader with a tag identification request command. During conflict survey and group sequencing efforts, the selected RFID reader is the only reader turned on (activated) at a time in an effort to identify which RFID tags are in range of the active RFID reader, all other RFID readers are deactivated at that time. The example tag logger 126 retrieves communication responses from the selected RFID reader to identify RFID tags that are responsive thereto during that first time. In the event the example RFID reader monitor 124 identifies one or more additional RFID reader(s) in the example RFID system 100, then it turns off the selected RFID reader and selects another alternate reader (at a second time) that has not yet performed a tag identification request, and the process repeats to identify one or more tags associated with the newly activated reader.

Figure 2A:
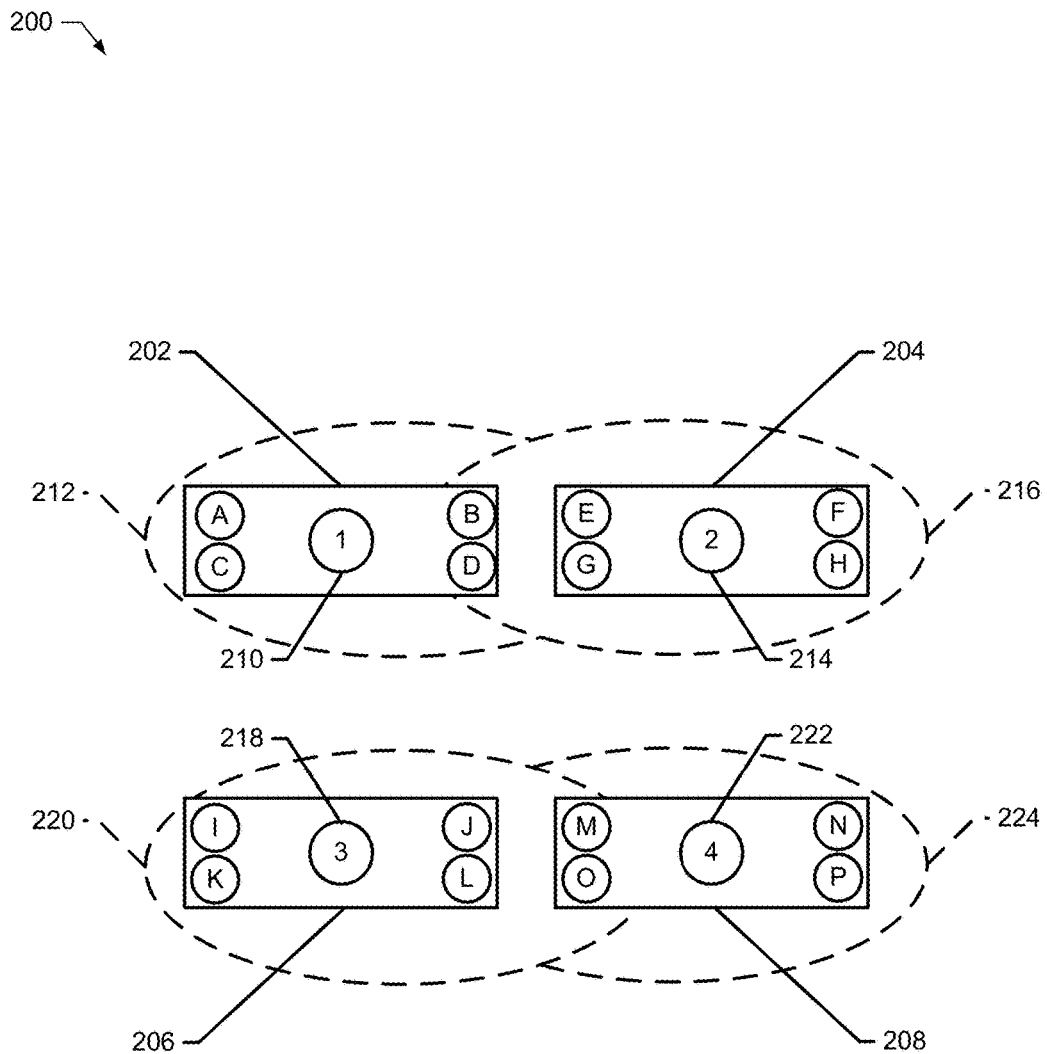
FIG. 2A is an example area of interest in which the example RFID system of FIG. 1 may operate to improve RFID tag communications.

To illustrate, FIG. 2A illustrates an example area of interest 200, such as a retail floor having a first merchandise table 202, a second merchandise table 204, a third merchandise table 206 and a fourth merchandise table 208. Each merchandise table of the illustrated example of FIG. 2A includes a corresponding RFID reader (interrogator), which is shown as an encircled number 1 through 4. Each corresponding RFID reader includes a corresponding RF boundary within which it can successfully communicate with one or more RFID tags. However, personnel that install an example RFID system within the example area of interest 200 may not necessarily know the precise boundaries of RF communication capabilities of each RFID reader. In the illustrated example of FIG. 2A, a first RFID reader 210 includes a first RF boundary 212, a second RFID reader 214 includes a second RF boundary 216, a third RFID reader 218 includes a third RF boundary 220, and a fourth RFID reader 222 includes a fourth RF boundary 224.

In the illustrated example of FIG. 2A, the first merchandise table 202 includes four example RFID tags labeled "A" through "D," the second merchandise table 204 includes four example RFID tags labeled "E" through "H," the third merchandise table 206 includes four example RFID tags labeled "I" through "L," and the fourth merchandise table 208 includes four example RFID tags labeled "M" through "P." As described above, the example tag logger identifies RFID tags responsive to any particular RFID reader that is energized in isolation. In some examples, the tag logger 126 generates a list of detected RFID tags by corresponding RFID readers, as shown in FIG. 2B.

In the illustrated example of FIG. 2B, the tag logger 126 generates an example reader/tag table 250. The example reader/tag table 250 includes a column corresponding to each RFID reader evaluated in the example RFID system, which includes a first RFID reader column 252 corresponding to the example first RFID reader 210, a second RFID reader column 254 corresponding to the example second RFID reader 214, a third RFID reader column 256 corresponding to the example third RFID reader 218, and a fourth RFID reader column 258 corresponding to the example fourth RFID reader 222. Additionally, the example tag logger 126 generates a number of rows corresponding to each tag that was detected in response to the example tag identification request command. While the illustrated example of FIG. 2B includes rows "A" through "P," examples disclosed herein are not limited thereto.

The example group generator 128 identifies which ones of the RFID readers received tag identification information from corresponding tags, as shown by check marks. After the example tag logger 126 populates the example reader/tag table 250 with check marks to identify which tags correspond to which RFID readers, the example group generator 128 identifies RFID readers that do not have any common RFID tags. In other words, the example group generator 128 evaluates each row to detect instances where more than one RFID reader retrieved tag data for the same tag. Stated differently, the example group generator 128 improves RFID tag communication success by identifying whether more than one RFID reader can communicate with a common RFID tag. Such instances are indicative of RFID reader overlap. In the event two or more RFID readers are activated for interrogation that share one or more common tags, then interference may result in a manner that precludes either RFID reader from being able to detect the common tag(s).

Example common tags are illustrated in FIG. 2A as tags "B," "D," "E," and "G," which are accessible by both the first RFID reader 210 and the second RFID reader 214. Similarly, RFID tags "J," "L," "M," and "O" are common with both the third RFID reader 218 and the fourth RFID reader 222. The example reader/tag table 250 generated by the example tag logger 126 illustrates which RFID readers may potentially cause interference issues in the event they both are energized at the same time. As shown in the illustrated example of FIG. 2B, RFID readers 1 and 2 exhibit common tag conflicts therebetween, and RFID readers 3 and 4 exhibit common tag conflicts therebetween. The example group generator 128 generates candidate RFID device groups that will not conflict (RFID readers allowed/permitted to operate at the same time) in the event they are active at the same time, such as RFID readers 1 and 3, RFID readers 1 and 4, RFID readers 2 and 3, or RFID readers 2 and 4. However, RFID readers 1 and 2 should not be energized at the same time (should be prevented from operating at the same time) to reduce the possibility of common tags causing communication interference. Similarly, RFID readers 3 and 4 should not be energized (prevented from operating) at the same time for the same reasons.

After generating candidate device groups (groups of RFID readers that are permitted to operate at the same time) that will not contain common tags and, thus, reduce a possibility of communication interference, the example group generator 128 also calculates a device group duty cycle of operation. For example, if each device group (e.g., RFID readers 1 and 3 and RFID readers 2 and 4) is to operate once each minute (e.g., an example threshold repeating time duration), then the example group generator allocates 30 seconds of activation time for each group. In some examples, the group generator 128 may allocate 15 seconds of activation time for each group in an alternating manner to achieve an alternate scanning granularity. While the illustrated example describes four RFID readers and two RFID device groups, examples disclosed herein are not limited thereto and any number of RFID readers and/or device groups may be realized.

As described above, in the event motion is detected in one or more regions of interest, then an RFID scanning behavior may be changed accordingly. Motion detection may occur in any number of ways, such as infra-red (IR) motion detectors, camera detectors, etc. In some examples when no motion has been detected (e.g., by the example motion sensor 136), a deep scan may occur to read as many tags as possible in the area of interest (e.g., to reach tags that may be buried under layers of other items/obstructions). In some examples when motion has been detected, a mobility scan may occur to obtain tag reads for those items that may be propagating from one location to another. In some examples, if no motion is detected for a threshold period of time, the example reader parameter modifier 120 may invoke a deep scan.

The example motion sensor monitor 130 determines if motion is detected near one or more RFID readers and, if so, the example RFID reader monitor 124 updates RFID reader configuration settings to reflect a mobility mode (e.g., a mode with configuration settings having a relatively higher/faster scan rate in an effort to capture a read of one or more tags that may be moving in/away from the RF boundary of a given RFID reader). On the other hand, in the event the example motion sensor monitor 130 determines that no motion has occurred, then the example RFID reader monitor 124 updates RFID reader configuration settings to reflect a deep scan mode. In either event, after the example RFID reader monitor 124 updates the configuration settings, the example tag logger 126 acquires any tag read data.

In response to a deep scan request, the example tag characterizer 132 identifies a persistence duration based on RFID tag characteristics. As used herein, a persistence duration reflects an amount of time that an RFID tag remains quiet after it has responded to a communication request. In particular, when an RFID tag completes its response to a communication request and then goes "quiet," this permits other RFID tags in the area to communicate with less interference, thereby improving a success of communication. In some examples, the persistence duration is a value based on manufacturing specifications of particular RFID tags, such as particular die sizes, capacitance capabilities, etc (e.g., persistence characteristics of RFID tags). Generally speaking, a deep scan utilizes all available RFID readers for at least a portion of the deep scan process in an effort to energize all target RFID tags with pre-communication power in the area(s) of interest. Once RF energy has been transmitted for a threshold period of time to energize the RFID tags, one or more RFID readers (e.g., multiple RFID readers assigned to a non-overlapping RFID group, as described above) may be configured to acquire tag information with a greater likelihood of success because those tags have already been energized and are more responsive to protocol requests. The remaining RFID readers that are not participating in a tag information request/query continue to operate in a timing pattern of non-protocol "bursts" of RF energy interspaced with pause/off durations (de-energize durations where ones of the RFID readers (e.g., groups of RFID readers) do not transmit RF energy).

The example timing pattern configuration engine 134 sets a group energize duration (T1) and a group off duration (T2) (e.g., a duration in which RF energy is paused and/or otherwise not being transmitted to RFID tags). In some examples, the group energize duration (T1) for RFID readers performing an energize mode is set to a value that is short as possible to reduce interference effects for those non-conflicting RFID readers performing a deep scan data acquisition of tag information (tag data acquisition). Additionally, in some examples the group off duration (T2) is set to a value that does not exceed a persistence duration of the RFID tags being interrogated. For example, if the group off duration (T2) is too long and exceeds a manufacturer-specified persistence duration, then the one or more RFID tags will no longer be in an energized state when a protocol request arrives from an RFID reader in a deep scan mode that is making a request for tag information. As such, communication success may be lower therebetween.

Figure 3:
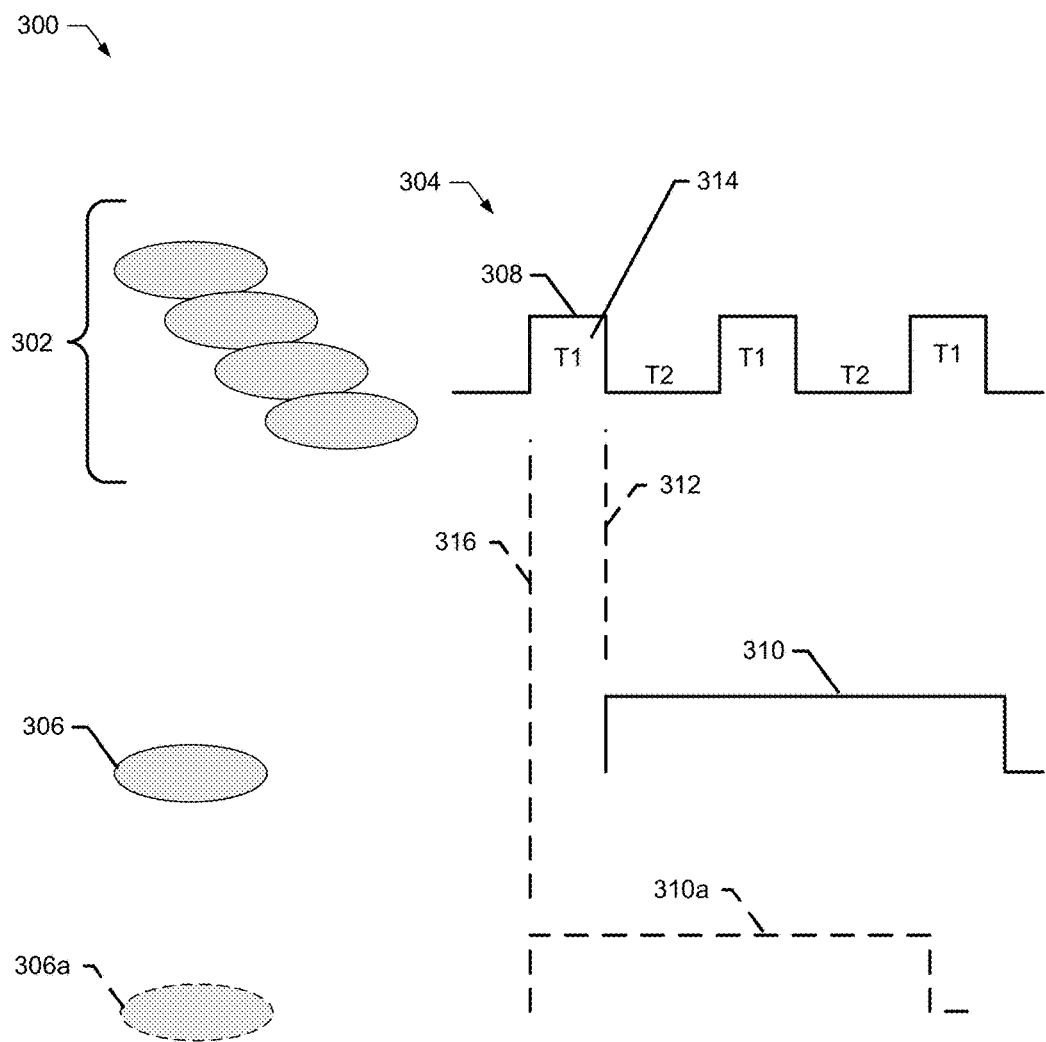
FIG. 3 is an example timing diagram generated by the example RFID system of FIG. 1 to improve tag communications.

FIG. 3 is an example timing diagram 300 for RFID readers participating in a deep scan. In the illustrated example of FIG. 3, all of the RFID readers 302 are set to an energize mode (e.g., an unmodulated RF carrier wave for pre-communication power provisioning to receiving tags) according to an example energize timing profile 304. The example energize timing profile 304 includes the group energize duration (T1) interspersed with the group off duration (T2). As indicated by a trailing edge 312 of a first instance 314 of the group energize duration (T1) 308, after a first instance of all RFID readers participating in the first instance 314 of the group energize duration (T1) 308, the example RFID reader monitor 124 selects one RFID reader or one RFID reader group 306 to acquire tag information. As described above, because all of the tags have received pre-communication power (e.g., RF energy before one or more communication attempts are made) from all of the RFID readers during the first instance of the group energize duration 308, all of the tags are more likely to be successfully responsive to one or more protocol requests for data from particular RFID readers. The selected RFID reader or RFID reader group 306 no longer operates in the energize mode during a deep scan duration 310, but rather sends tag query requests for tag data. In some examples, improved tag communication success occurs during the example group off duration (T2) of the remaining group of RFID readers because less RF interference occurs when the selected RFID reader or RFID reader group 306 makes tag communication attempts. When the selected RFID reader or RFID reader group 306 has completed data acquisition (tag data acquisition) during the deep scan duration 310, the example RFID reader monitor 124 selects an alternate RFID reader or RFID reader group to perform data acquisition during the deep scan duration 310. In some examples, the example RFID reader monitor 124 selects one RFID reader or one RFID reader group 306a during a leading edge 316 of the first instance 314 of the group energize duration (T1) 308. In such examples, the selected RFID reader or RFID reader group 306a no longer operates in the energize mode during a deep scan duration 310a, but rather sends tag query requests for tag data.

While an example manner of implementing the RFID system 100 of FIG. 1 is illustrated in FIGS. 1, 2A, 2B and 3, one or more of the elements, processes and/or devices illustrated in FIGS. 1, 2A, 2B and/or 3 may be combined, divided, re-arranged, omitted, eliminated and/or implemented in any other way. Further, the example gateway behavior engine 116, the example conflict determiner 118, the example RFID reader monitor 124, the example tag logger 126, the example group generator 128, the example reader parameter modifier 120, the example motion sensor monitor 130, the example motion sensor 136, the example deep scanner 122, the example tag characterizer 132, the example timing pattern configuration engine 134 and/or, more generally, the example RFID gateway 112 of FIG. 1 may be implemented by hardware, software, firmware and/or any combination of hardware, software and/or firmware. Thus, for example, any of the example gateway behavior engine 116, the example conflict determiner 118, the example RFID reader monitor 124, the example tag logger 126, the example group generator 128, the example reader parameter modifier 120, the example motion sensor monitor 130, the example motion sensor 136, the example deep scanner 122, the example tag characterizer 132, the example timing pattern configuration engine 134 and/or, more generally, the example RFID gateway 112 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example gateway behavior engine 116, the example conflict determiner 118, the example RFID reader monitor 124, the example tag logger 126, the example group generator 128, the example reader parameter modifier 120, the example motion sensor monitor 130, the example motion sensor 136, the example deep scanner 122, the example tag characterizer 132, the example timing pattern configuration engine 134 and/or, more generally, the example RFID gateway 112 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example RFID gateway 112 of FIG. 1 may include one or more elements, processes and/or devices in addition to, or instead of, those illustrated in FIGS. 1, 2A, 2B and/or 3, and/or may include more than one of any or all of the illustrated elements, processes and devices.

Flowcharts representative of example machine readable instructions for implementing the RFID system 100 of FIG. 1 are shown in FIGS. 4-7. In these examples, the machine readable instructions comprise a program for execution by a processor such as the processor 812 shown in the example processor platform 800 discussed below in connection with FIG. 8. The programs may be embodied in software stored on a non-transitory computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowcharts illustrated in FIGS. 4-7, many other methods of implementing the example RFID system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 4:
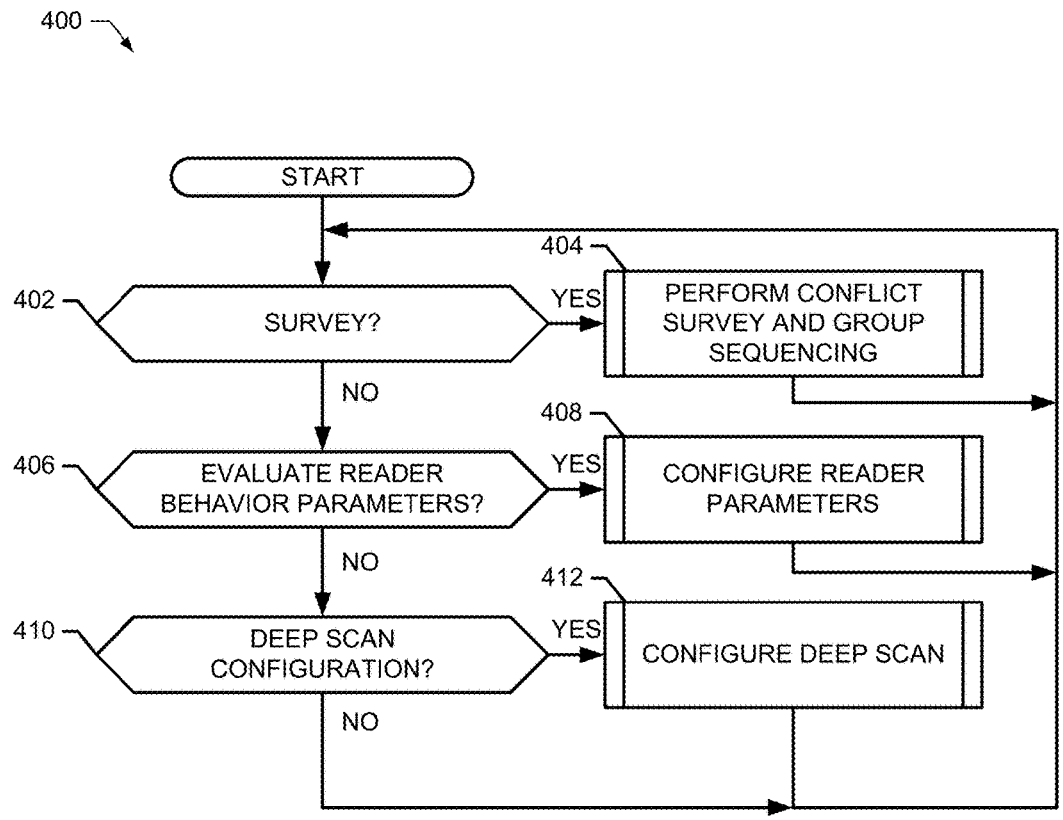
FIGS. 4-7 are flowcharts representative of example machine readable instructions that may be executed to implement the example RFID system of FIG. 1 to improve tag communications.

The program 400 of FIG. 4 begins at block 402, wherein the example gateway behavior engine 116 determines whether to initiate and/or otherwise invoke a survey of an area to be monitored. If so, the example gateway behavior engine 116 invokes the example conflict determiner 118 to perform conflict survey and group sequencing (block 404), as described above and in further detail below. However, in the event the example gateway behavior engine 116 determines that the survey of the area to be monitored is not to occur (block 202), then the example gateway behavior engine 116 determines whether to evaluate configuration parameters of one or more RFID readers (block 406). In some examples, the gateway behavior engine 116 invokes the example reader parameter modifier 120 to configure reader parameters (block 408) on a periodic, aperiodic, scheduled, or manual basis, while in other examples the gateway behavior engine 116 invokes the example reader parameter modifier 120 in response to the detection of motion.

In the event the example gateway behavior engine 116 determines that the reader behavior parameters are not to be evaluated (block 406) (e.g., a scheduled duration has not yet been satisfied, no motion has occurred, etc.), then the example gateway behavior engine 116 determines whether to configure one or more RFID readers for deep scan operation (block 410). If so, the example gateway behavior engine 416 invokes the example deep scanner 122 to configure RFID reader(s) for deep scan operation (block 412), as described above and in further detail below.

Figure 5:
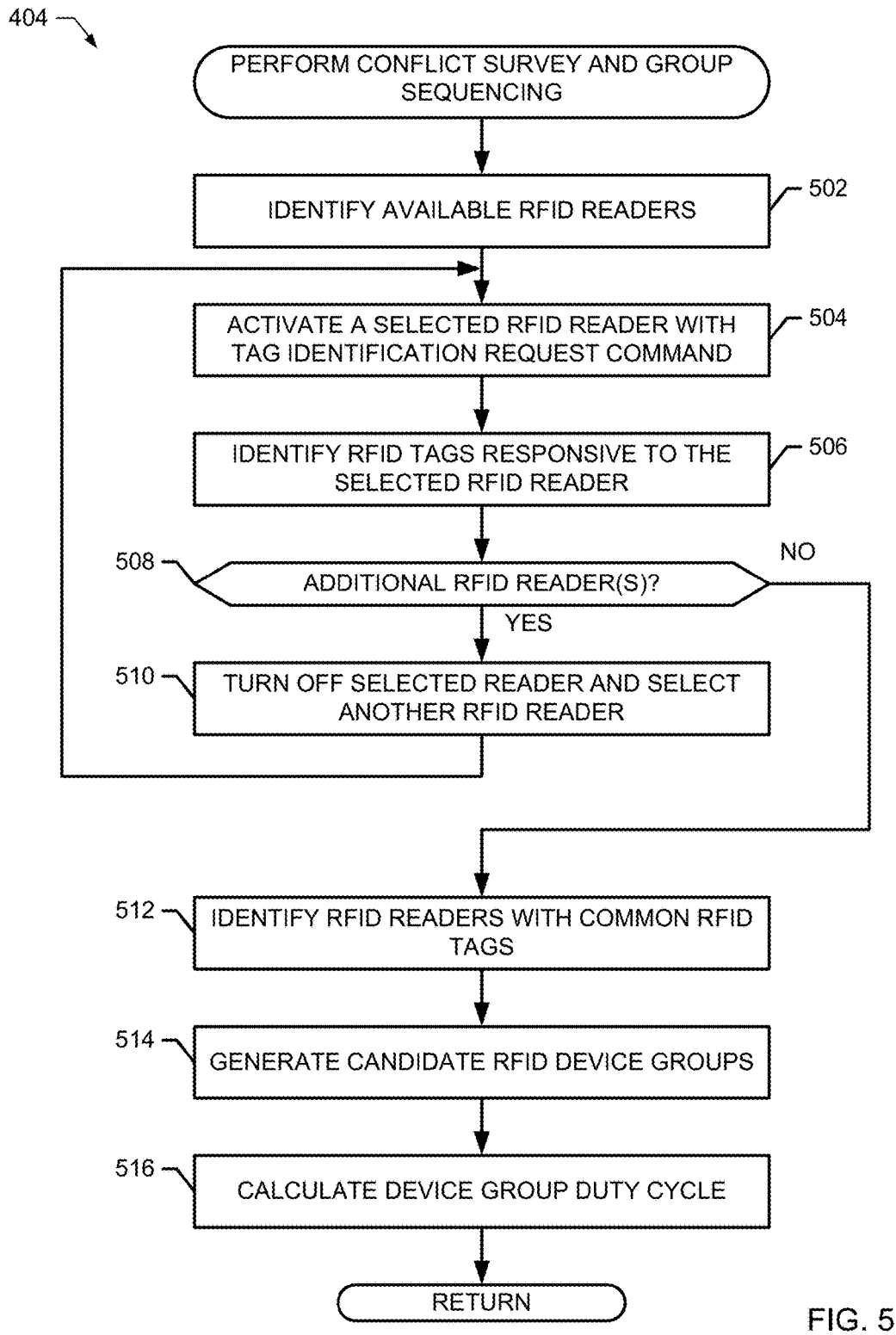

FIG. 5 illustrates additional detail in connection with performing conflict survey and group sequencing (block 404) of FIG. 4. In the illustrated example of FIG. 5, the example RFID reader monitor 124 identifies available RFID readers within an area to be monitored (block 502), such as identifying the example first reader 102, the example second reader 104, the example third reader 106 and the example fourth reader 108. The example RFID reader monitor 124 activates a selected RFID reader with a tag identification request command (e.g., using default RFID reader configuration settings, using deep scan RFID reader configuration settings, etc.) (block 504), and the example tag logger 126 identifies RFID tags that are responsive to the selected RFID reader currently active and transmitting the read request(s) (block 506) (note that the other RFID readers are powered off at this time).

If the example RFID reader monitor 124 determines that there are one or more additional RFID readers in the example system 100 that have not yet been activated to collect tag data (block 508), then it turns off the currently selected RFID reader and selects another (alternate) RFID reader within the example system 100 to evaluate (block 510). Control then returns to block 504. On the other hand, if the example RFID reader monitor 124 determines that there are no more RFID readers left to be evaluated (block 508), then the example group generator 128 identifies RFID readers with common RFID tags (block 512). As described above in connection with FIGS. 2A and 2B, the example reader/tag table 250 generated by the example tag logger 126 may be analyzed by the example group generator 128 to search for instances where different RFID readers capture data from a common RFID tag, which is indicative of potential interference conditions. To reduce, minimize and/or otherwise eliminate interference conditions, the example group generator 128 generates one or more candidate RFID device groups (block 514) that, if powered on at the same time for a data acquisition request, would not cause an RFID tag to receive RF energy from the same RFID reader.

The example group generator 128 also determines a device group duty cycle of operation based on a number of individual RFID readers that can be powered on at the same time without causing RF interference (block 516). RFID readers that can be powered on at the same time without causing RF interference and/or without being able to energize a same RFID tag are referred to herein as isolated RFID readers. Examples disclosed herein a number of sets of isolated RFID readers so that such sets may be energized at the same time (e.g., simultaneously) without concern for causing interference. For example, four separate RFID readers may be determined to have only two readers on at one time to prevent interference, thereby resulting in two separate RFID groups. In the event a design goal is to have each RFID group perform a scan once each minute, then the example group generator 128 allocates thirty (30) seconds of time for each RFID group. Any number of RFID groups and/or design goals for scans per unit of time may be considered, without limitation.

Figure 6:
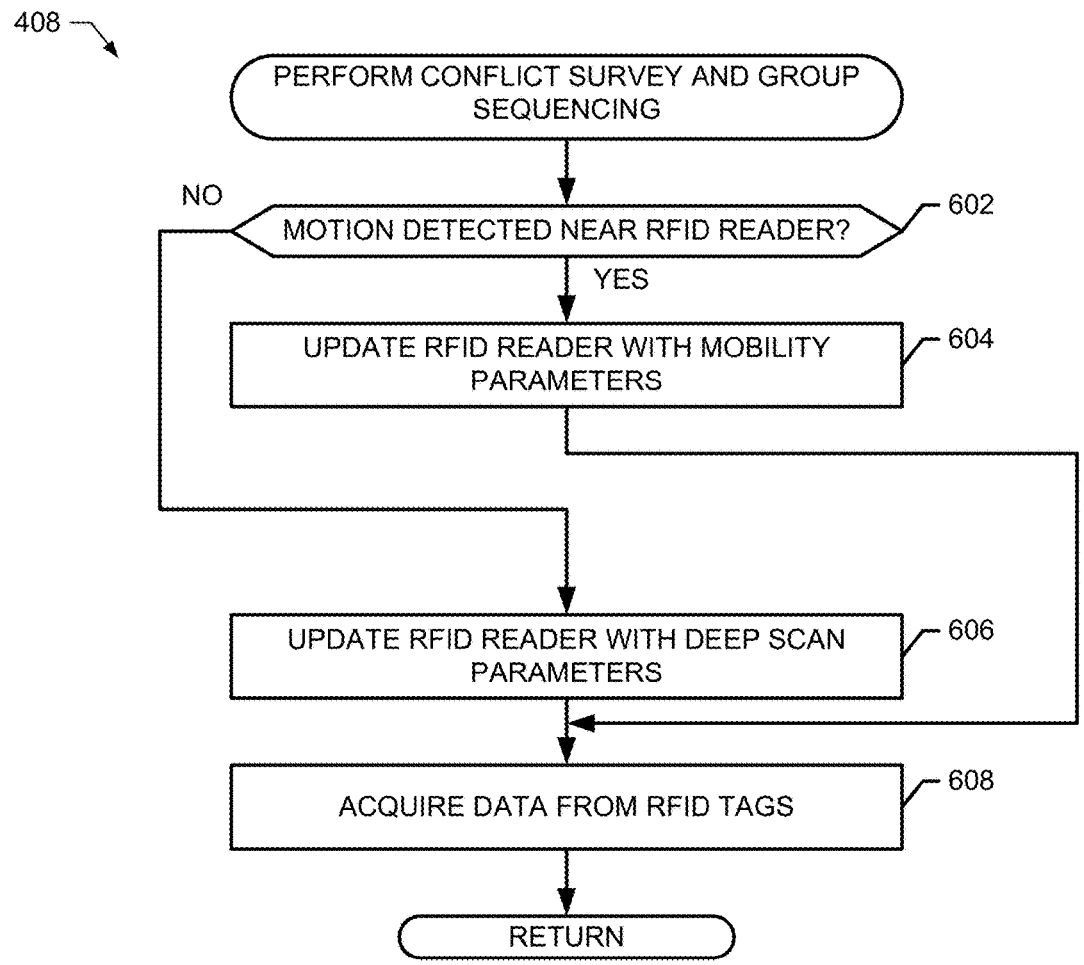

FIG. 6 illustrates additional detail in connection with configuring reader parameters (block 408) of FIG. 4. In the illustrated example of FIG. 6, the example motion sensor monitor 130 determines whether motion has been detected near one or more RFID readers (block 602). If so, the RFID reader monitor 124 updates the RFID readers in the area of interest (e.g., proximate to the example motion sensor 136) with mobility configuration parameters (block 604), such as a first profile of configuration parameters that are suited for faster RFID tag scanning. However, in the event the example motion sensor monitor 130 determines that no motion has occurred in the area of interest (block 602), then the example RFID reader monitor 124 updates the RFID readers in the area of interest with deep scan configuration parameters (block 606), as described above and in further detail below. As described above, circumstances without motion in the area of interest suggest that relatively longer scan durations and deep scan operations can occur to attempt a more thorough acquisition of tags in the location of interest, such as one or more tags that may be obstructed in a manner that makes RF communication more difficult. In either the mobility mode (block 604) or the deep scan mode (block 606), the example tag logger 126 acquires data from the RFID tags responsive to the queries (block 608).

Figure 7:
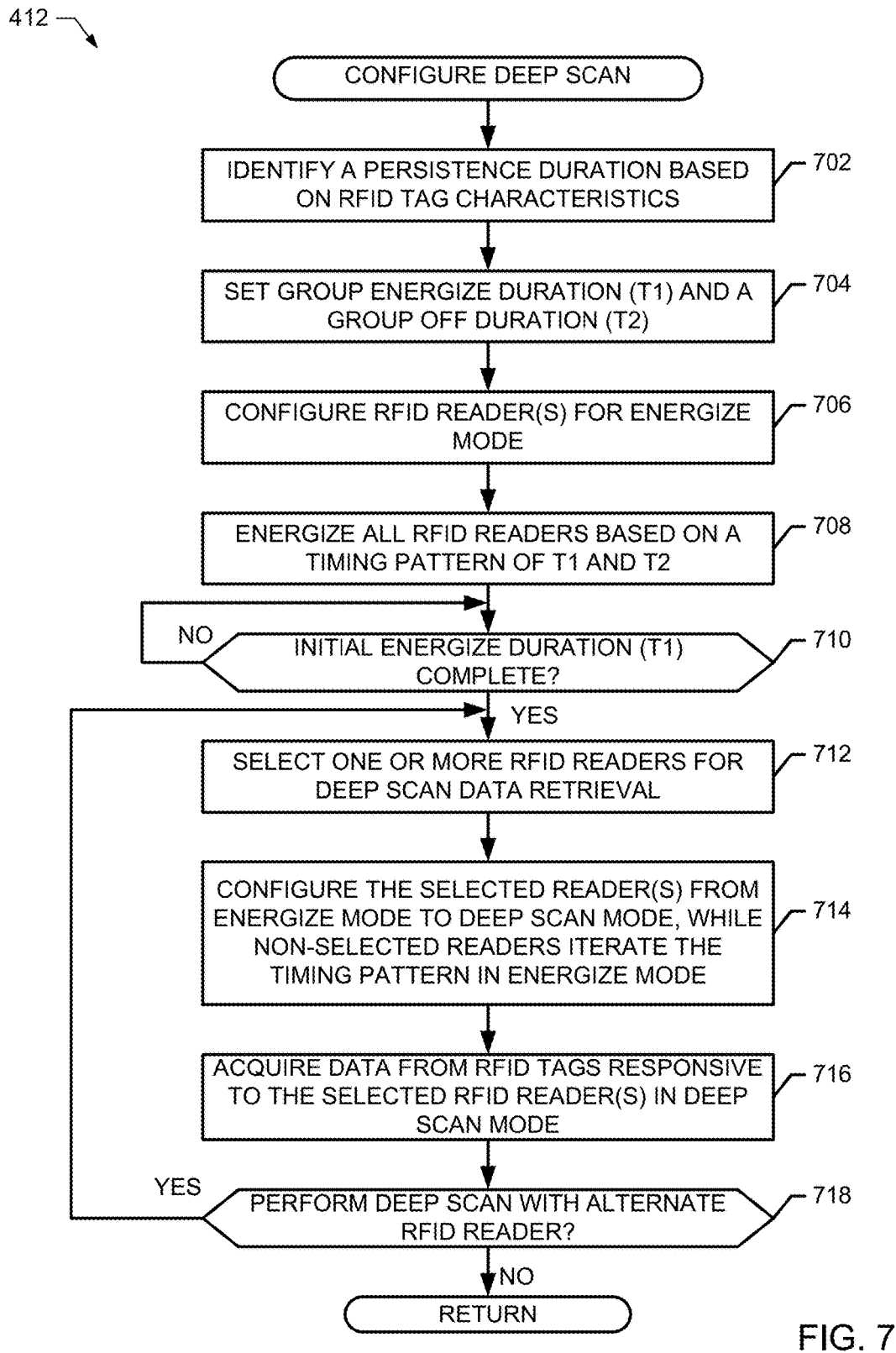

FIG. 7 illustrates additional detail in connection with configuring one or more RFID readers for the deep scan operation/mode (block 412). In the illustrated example of FIG. 7, the example tag characterizer 132 identifies a persistence duration based on RFID tag characteristics (block 702). In some examples, manufacturers of RFID tags publish persistence duration information (e.g., values in milliseconds). The example timing pattern configuration engine 134 sets a group energize duration (T1) and a group off duration (T2) (block 704), and the example RFID reader monitor 124 configures RFID readers for the energize mode (block 706). As described above, the example energize mode may include transmission of unmodulated RF energy by the RFID readers in an effort to "wake up" proximate RFID tags such that they will be more responsive in the event of another RF request for information. The example RFID reader monitor 124 energizes all RFID readers based on an energize timing profile (block 708), such as the example energize timing profile 304 illustrated in FIG. 3.

After the example timing pattern configuration engine 134 determines that an initial energize duration (T1) is complete (block 710), such as the first instance of all RFID readers participating in the group energize duration (T1) 308, then the example RFID reader monitor 124 selects one or more RFID readers (e.g., an RFID group) for deep scan data retrieval (block 712). The example RFID reader monitor 124 configures the selected one or more RFID readers from the prior energize mode (e.g., during which an unmodulated RF carrier wave was being emitted to keep RFID tags "awake") to a deep scan mode, while non-selected RFID readers continue to iterate through the example energize timing profile 304 (block 714). The example tag logger 126 acquires data from one or more RFID tags that are responsive to the selected one or more RFID readers in the deep scan mode (block 716), and the example RFID reader monitor 124 determines whether there are one or more alternate RFID readers and/or reader groups to participate in a deep scan mode data acquisition (block 718). If so, control returns to block 712.

Figure 8:
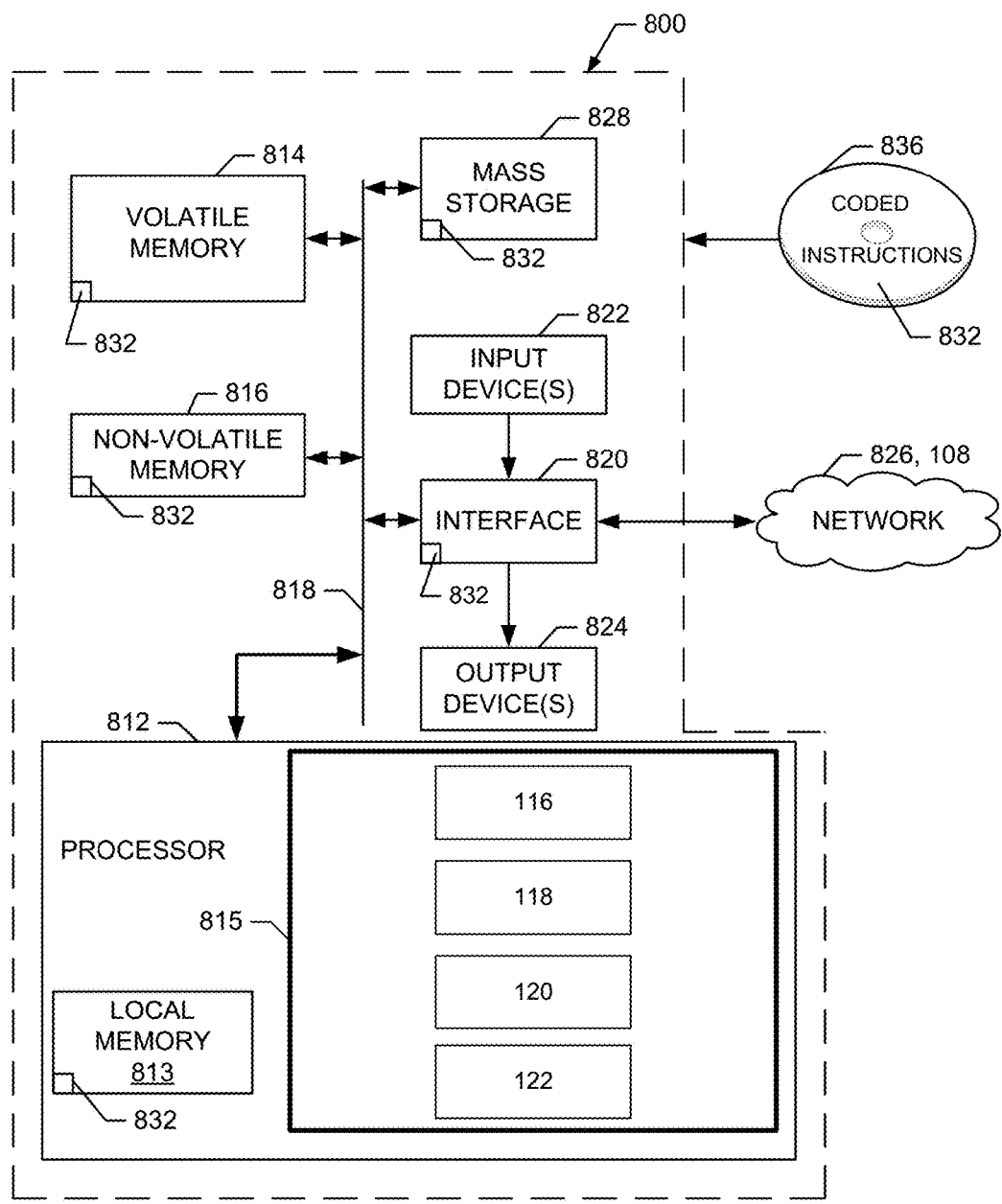
FIG. 8 is a block diagram of an example processor platform structured to execute the example machine readable instructions of FIGS. 4-7 to implement the example RFID system of FIG. 1.

FIG. 8 is a block diagram of an example processor platform 800 capable of executing the instructions of FIGS. 4-7 to implement the RFID system 100 of FIGS. 1, 2A, 2B and 3. The processor platform 800 can be, for example, a server, a personal computer, a mobile device (e.g., a cell phone, a smart phone, a tablet such as an iPad™), a personal digital assistant (PDA), an Internet appliance, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor 812 implements the example gateway behavior engine 116, the example conflict determiner 118, the example reader parameter modifier 120 and the example deep scanner 122.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 4-7 may be stored in the mass storage device 828, in the volatile memory 814, in the non-volatile memory 816, and/or on a removable tangible computer readable storage medium such as a CD or DVD.

From the foregoing, it will be appreciated that example methods, apparatus and articles of manufacture have been disclosed that improve a success of communicating with RFID tags in an area of interest. Examples disclosed herein remove uncertainty by RFID configuration personnel that are attempting to optimize one or more RFID readers in an effort to reduce interference. In particular, examples disclosed herein conduct conflict survey operations of the area of interest to identify RFID readers that exhibit interference with one or more other RFID readers, and generate combinations of RFID readers that are permitted to operate at the same time, as well as combinations of RFID readers that are prevented from operating at the same time to avoid interference. Examples disclosed herein also improve RFID reader success by applying an energize timing profile to RFID readers that provides RFID tags with pre-communication power. As such, when efforts are later made to obtain data from the RFID tags, such tags are already supplied with adequate power to enable communication in a more successful manner.

Example methods, systems, apparatus and articles of manufacture to improve radio frequency identification (RFID) tag communication are disclosed herein. Some such examples and combinations thereof include the following.

Example 1 is an apparatus to improve radio frequency identification (RFID) tag communication, the apparatus including an RFID reader monitor to activate a first RFID reader and deactivate a second RFID reader during a first tag data acquisition at a first time, and deactivate the first RFID reader and activate the second RFID reader during a second tag data acquisition at a second time, a tag logger to identify a first set of RFID tags detected by the first RFID reader at the first time, and identify a second set of RFID tags detected by the second RFID reader at the second time, and a group generator to improve RFID tag communication by identifying which one of the first RFID reader and the second RFID reader communicates with a common RFID tag.

Example 2 includes the apparatus as defined in example 1, wherein the common RFID tag is within the first set of RFID tags and the second set of RFID tags.

Example 3 includes the apparatus as defined in example 1, wherein the group generator is to generate a first device group indicative of a plurality of RFID readers that can operate at the same time without respective ones of the plurality of RFID readers energizing a same RFID tag.

Example 4 includes the apparatus as defined in example 1, wherein the group generator is to identify whether the first RFID reader and the second RFID reader should be prevented from operating at the same time.

Example 5 includes the apparatus as defined in example 1, wherein the group generator is to identify a first set of RFID readers to operate at a first time and a second set of RFID readers to be prevented from operating at the first time.

Example 6 includes the apparatus as defined in example 5, wherein the group generator is to permit the second set of RFID readers to operate at a second time, and prevent the first set of RFID readers from operating at the second time.

Example 7 includes the apparatus as defined in example 5, wherein the group generator is to calculate a duty cycle of operation for the first set of RFID readers and the second set of RFID readers based on (a) a number of sets of isolated RFID readers and (b) a threshold repeating time duration.

Example 8 includes the apparatus as defined in example 1, further including a motion sensor to, in response to detecting motion in an area of interest proximate to the first RFID reader or the second RFID reader, update an operating mode of at least one of the first RFID reader or the second RFID reader.

Example 9 includes the apparatus as defined in example 8, wherein the operating mode includes a set of RFID reader configuration settings retrieved from a memory as a profile.

Example 10 is an apparatus to improve radio frequency identification (RFID) tag communication, the apparatus including a timing pattern configuration engine to set an energize timing profile having a group energize duration and a group de-energize duration, and an RFID reader monitor to energize a plurality of RFID readers for a first energize duration of the energize timing profile, and in response to an end of the first energize duration, configure first ones of the plurality of RFID readers to perform tag reads.

Example 11 includes the apparatus as defined in example 10, wherein the RFID reader monitor is to iterate remaining ones of the plurality of RFID readers with the energize timing profile while the first ones of the plurality of RFID readers perform tag reads.

Example 12 includes the apparatus as defined in example 10, wherein the timing pattern configuration engine is to set the group de-energize duration based on a persistence characteristic of RFID tags.

Example 13 includes the apparatus as defined in example 10, wherein the RFID reader monitor is to provide pre-communication power to the plurality of RFID readers by sending an unmodulated radio frequency (RF) signal during the first energize duration.

Example 14 is a non-transitory computer-readable medium comprising instructions to improve radio frequency identification (RFID) tag communication that, when executed, cause one or more processors to, at least activate a first RFID reader and deactivate a second RFID reader during a first tag data acquisition at a first time, deactivate the first RFID reader and activating the second RFID reader during a second tag data acquisition at a second time, identify a first set of RFID tags detected by the first RFID reader at the first time, identify a second set of RFID tags detected by the second RFID reader at the second time, and improve RFID tag communication by identifying which one of the first RFID reader and the second RFID reader communicates with a common RFID tag.

Example 15 includes the computer-readable medium as defined in example 14, wherein the instructions, when executed, further cause the one or more processors to identify that the common RFID tag is within the first set of RFID tags and the second set of RFID tags.

Example 16 includes the computer-readable medium as defined in example 14, wherein the instructions, when executed, further cause the one or more processors to generate a first device group indicative of a plurality of RFID readers that can operate at the same time without respective ones of the plurality of RFID readers energizing a same RFID tag.

Example 17 includes the computer-readable medium as defined in example 14, wherein the instructions, when executed, further cause the one or more processors to identify whether the first RFID reader and the second RFID reader should be prevented from operating at the same time.

Example 18 includes the computer-readable medium as defined in example 14, wherein the instructions, when executed, further cause the one or more processors to identify a first set of RFID readers to operate at a first time and a second set of RFID readers to be prevented from operating at the first time.

Example 19 includes the computer-readable medium as defined in example 18, wherein the instructions, when executed, further cause the one or more processors to permit the second set of RFID readers to operate at a second time, and prevent the first set of RFID readers from operating at the second time.

Example 20 includes the computer-readable medium as defined in example 18, wherein the instructions, when executed, further cause the one or more processors to calculate a duty cycle of operation for the first set of RFID readers and the second set of RFID readers based on (a) a number of sets of isolated RFID readers and (b) a threshold repeating time duration.

Example 21 includes the computer-readable medium as defined in example 14, wherein the instructions, when executed, further cause the one or more processors to update an operating mode of at least one of the first RFID reader or the second RFID reader in response to detecting motion in an area of interest via a motion sensor.

Example 22 includes the computer-readable medium as defined in example 21, wherein the instructions, when executed, further cause the one or more processors to retrieve the operating mode as a set of RFID reader configuration settings from a memory.

Example 23 is a computer-implemented method to improve radio frequency identification (RFID) tag communication, the method including activating, by executing an instruction with a processor, a first RFID reader and deactivating a second RFID reader during a first tag data acquisition at a first time, deactivating, by executing an instruction with the processor, the first RFID reader and activating the second RFID reader during a second tag data acquisition at a second time, identifying, by executing an instruction with the processor, a first set of RFID tags detected by the first RFID reader at the first time, identifying, by executing an instruction with the processor, a second set of RFID tags detected by the second RFID reader at the second time, and improving RFID tag communication, by executing an instruction with the processor, by identifying which one of the first RFID reader and the second RFID reader communicates with a common RFID tag.

Example 24 includes the method as defined in example 23, wherein the common RFID tag is within the first set of RFID tags and the second set of RFID tags.

Example 25 includes the method as defined in example 23, further including generating a first device group indicative of a plurality of RFID readers that can operate at the same time without respective ones of the plurality of RFID readers energizing a same RFID tag.

Example 26 includes the method as defined in example 23, further including identifying whether the first RFID reader and the second RFID reader should be prevented from operating at the same time.

Example 27 includes the method as defined in example 23, further including identifying a first set of RFID readers to operate at a first time and a second set of RFID readers to be prevented from operating at the first time.

Example 28 includes the method as defined in example 27, further including permitting the second set of RFID readers to operate at a second time, and preventing the first set of RFID readers from operating at the second time.

Example 29 includes the method as defined in example 27, further including calculating a duty cycle of operation for the first set of RFID readers and the second set of RFID readers based on (a) a number of sets of isolated RFID readers and (b) a threshold repeating time duration.

Example 30 includes the method as defined in example 23, further including updating an operating mode of at least one of the first RFID reader or the second RFID reader in response to detecting motion in an area of interest via a motion sensor.

Example 31 includes the method as defined in example 30, wherein the operating mode includes a set of RFID reader configuration settings retrieved from a memory as a profile.

Example 32 is a system to improve radio frequency identification (RFID) tag communication, the system including a means for activating a first RFID reader and deactivate a second RFID reader during a first tag data acquisition at a first time, a means for deactivating the first RFID reader and activating the second RFID reader during a second tag data acquisition at a second time, a means for identifying a first set of RFID tags detected by the first RFID reader at the first time, a means for identifying a second set of RFID tags detected by the second RFID reader at the second time, and a means for improving RFID tag communication by identifying which one of the first RFID reader and the second RFID reader communicates with a common RFID tag.

Example 33 includes the system as defined in example 32, further including a means for identifying that the common RFID tag is within the first set of RFID tags and the second set of RFID tags.

Example 34 includes the system as defined in example 32, further including a means for generating a first device group indicative of a plurality of RFID readers that can operate at the same time without respective ones of the plurality of RFID readers energizing a same RFID tag.

Example 35 includes the system as defined in example 32, further including a means for identifying whether the first RFID reader and the second RFID reader should be prevented from operating at the same time.

Example 36 includes the system as defined in example 32, further including a means for identifying a first set of RFID readers to operate at a first time and a second set of RFID readers to be prevented from operating at the first time.

Example 37 includes the system as defined in example 36, further including a means for permitting the second set of RFID readers to operate at a second time, and a means for preventing the first set of RFID readers from operating at the second time.

Example 38 includes the system as defined in example 36, further including a means for calculating a duty cycle of operation for the first set of RFID readers and the second set of RFID readers based on (a) a number of sets of isolated RFID readers and (b) a threshold repeating time duration.

Example 39 includes the system as defined in example 32, further including a means for updating an operating mode of at least one of the first RFID reader or the second RFID reader in response to detecting motion in an area of interest via a motion sensor.

Example 40 includes the system as defined in example 39, further including a means for retrieving the operating mode as a set of RFID reader configuration settings from a memory.

Example 41 is a non-transitory computer-readable medium comprising instructions to improve radio frequency identification (RFID) tag communication that, when executed, cause one or more processors to, at least set an energize timing profile having a group energize duration and a group de-energize duration, energize a plurality of RFID readers for a first energize duration of the energize timing profile, and in response to an end of the first energize duration, configure first ones of the plurality of RFID readers to perform tag reads.

Example 42 includes the computer-readable medium as defined in example 41, wherein the instructions, when executed, further cause the one or more processors to iterate remaining ones of the plurality of RFID readers with the energize timing profile while the first ones of the plurality of RFID readers perform tag reads.

Example 43 includes the computer-readable medium as defined in example 41, wherein the instructions, when executed, further cause the one or more processors to set the group de-energize duration based on a persistence characteristic of RFID tags.

Example 44 includes the computer-readable medium as defined in example 41, wherein the instructions, when executed, further cause the one or more processors to provide pre-communication power to the plurality of RFID readers by sending an unmodulated radio frequency (RF) signal during the first energize duration.

Example 45 is a computer-implemented method to improve radio frequency identification (RFID) tag communication, the method including setting, by executing an instruction with a processor, an energize timing profile having a group energize duration and a group de-energize duration, energizing, by executing an instruction with the processor, a plurality of RFID readers for a first energize duration of the energize timing profile, and in response to an end of the first energize duration, configuring, by executing an instruction with the processor, first ones of the plurality of RFID readers to perform tag reads.

Example 46 includes the computer-implemented method as defined in example 45, further including iterating remaining ones of the plurality of RFID readers with the energize timing profile while the first ones of the plurality of RFID readers perform tag reads.

Example 47 includes the computer-implemented method as defined in example 45, further including setting the group de-energize duration based on a persistence characteristic of RFID tags.

Example 48 includes the computer-implemented method as defined in example 45, further including providing pre-communication power to the plurality of RFID readers by sending an unmodulated radio frequency (RF) signal during the first energize duration.

Example 49 is a system to improve radio frequency identification (RFID) tag communication, the system including a means for setting an energize timing profile having a group energize duration and a group de-energize duration, a means for energizing a plurality of RFID readers for a first energize duration of the energize timing profile, and in response to an end of the first energize duration, a means for configuring first ones of the plurality of RFID readers to perform tag reads.

Example 50 includes the system as defined in example 49, further including a means for iterating remaining ones of the plurality of RFID readers with the energize timing profile while the first ones of the plurality of RFID readers perform tag reads.

Example 51 includes the system as defined in example 49, further including a means for setting the group de-energize duration based on a persistence characteristic of RFID tags.

Example 52 includes the system as defined in example 49, further including a means for providing pre-communication power to the plurality of RFID readers by sending an unmodulated radio frequency (RF) signal during the first energize duration.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to improve radio frequency identification (RFID) tag communication, the apparatus comprising:
   an RFID reader monitor to:
      activate a first RFID reader and deactivate a second RFID reader during a first tag data acquisition at a first time, the first RFID reader to transmit pre-communication power as an unmodulated radio frequency (RF) signal during a first portion of the first time; and
      deactivate the first RFID reader and activate the second RFID reader during a second tag data acquisition at a second time, the second RFID reader to transmit pre-communication power as an unmodulated RF signal during a first portion of the second time;
   a tag logger to:
      identify a first set of RFID tags detected by the first RFID reader at a second portion of the first time, the first RFID reader to transmit a protocol request during the second portion of the first time; and
      identify a second set of RFID tags detected by the second RFID reader at a second portion of the second time, the second RFID reader to transmit a protocol request during the second portion of the second time; and
   a group generator to identify which one of the first RFID reader and the second RFID reader communicates with a common RFID tag.

2. The apparatus as defined in claim 1, wherein the common RFID tag is within the first set of RFID tags and the second set of RFID tags.

3. The apparatus as defined in claim 1, wherein the group generator is to generate a first device group indicative of RFID readers that can operate at the same time without respective ones of the RFID readers energizing a same RFID tag.

4. The apparatus as defined in claim 1, wherein the group generator is to identify whether the first RFID reader and the second RFID reader should be prevented from operating at the same time.

5. The apparatus as defined in claim 1, wherein the group generator is to identify a first set of RFID readers to operate at a first time and a second set of RFID readers to be prevented from operating at the first time.

6. The apparatus as defined in claim 5, wherein the group generator is to:
   permit the second set of RFID readers to operate at the second time; and
   prevent the first set of RFID readers from operating at the second time.

7. The apparatus as defined in claim 5, wherein the group generator is to calculate a duty cycle of operation for the first set of RFID readers and the second set of RFID readers based on (a) a number of sets of isolated RFID readers and (b) a threshold repeating time duration.

8. The apparatus as defined in claim 1, further including a motion sensor monitor to detect motion in an area of interest proximate to the first RFID reader or the second RFID reader, the motion sensor monitor to update an operating mode of at least one of the first RFID reader or the second RFID reader.

9. The apparatus as defined in claim 8, wherein the operating mode includes a set of RFID reader configuration settings retrieved from a memory as a profile.

10. A non-transitory computer-readable medium comprising instructions to improve radio frequency identification (RFID) tag communication that, when executed, cause one or more processors to, at least:
    activate a first RFID reader and deactivate a second RFID reader during a first tag data acquisition at a first time, the first RFID reader to transmit pre-communication power as an unmodulated ratio frequency (RF) signal during a first portion of the first time;
    deactivate the first RFID reader and activate the second RFID reader during a second tag data acquisition at a second time, the second RFID reader to transmit pre-communication power as an unmodulated RF signal during a first portion of the second time;
    identify a first set of RFID tags detected by the first RFID reader at a second portion of the first time, the first RFID reader to transmit a protocol request during the second portion of the first time;

identify a second set of RFID tags detected by the second RFID reader at a second portion of the second time, the second RFID reader to transmit a protocol request during the second portion of the second time; and identify which one of the first RFID reader and the second RFID reader communicates with a common RFID tag.

11. The computer-readable medium as defined in claim 10, wherein the instructions, when executed, further cause the one or more processors to identify that the common RFID tag is within the first set of RFID tags and the second set of RFID tags.

12. The computer-readable medium as defined in claim 10, wherein the instructions, when executed, further cause the one or more processors to generate a first device group indicative of RFID readers that can operate at the same time without respective ones of the RFID readers energizing a same RFID tag.

13. The computer-readable medium as defined in claim 10, wherein the instructions, when executed, further cause the one or more processors to identify whether the first RFID reader and the second RFID reader should be prevented from operating at the same time.

14. The computer-readable medium as defined in claim 10, wherein the instructions, when executed, further cause the one or more processors to identify a first set of RFID readers to operate at a first time and a second set of RFID readers to be prevented from operating at the first time.

15. The computer-readable medium as defined in claim 14, wherein the instructions, when executed, further cause the one or more processors to:

permit the second set of RFID readers to operate at the second time; and prevent the first set of RFID readers from operating at the second time.

16. The computer-readable medium as defined in claim 14, wherein the instructions, when executed, further cause the one or more processors to calculate a duty cycle of operation for the first set of RFID readers and the second set of RFID readers based on (a) a number of sets of isolated RFID readers and (b) a threshold repeating time duration.

17. The computer-readable medium as defined in claim 10, wherein the instructions, when executed, further cause the one or more processors to update an operating mode of at least one of the first RFID reader or the second RFID reader in response to motion detected in an area of interest via a motion sensor.

18. The computer-readable medium as defined in claim 17, wherein the instructions, when executed, further cause the one or more processors to retrieve the operating mode as a set of RFID reader configuration settings from a memory.

19. A computer-implemented method to improve radio frequency identification (RFID) tag communication, the method comprising:

activating, by executing an instruction with a processor, a first RFID reader and deactivating a second RFID reader during a first tag data acquisition at a first time, the first RFID reader to transmit pre-communication power as an unmodulated radio frequency (RF) signal during a first portion of the first time;

deactivating, by executing an instruction with the processor, the first RFID reader and activating the second RFID reader during a second tag data acquisition at a second time, the second RFID reader to transmit pre-communication power as an unmodulated RF signal during a first portion of the second time;

identifying, by executing an instruction with the processor, a first set of RFID tags detected by the first RFID reader at a second portion of the first time, the first RFID reader to transmit a protocol request during the second portion of the first time;

identifying, by executing an instruction with the processor, a second set of RFID tags detected by the second RFID reader at a second portion of the second time, the second RFID reader to transmit a protocol request during the second portion of the second time; and identify, by executing an instruction with the processor, which one of the first RFID reader and the second RFID reader communicates with a common RFID tag.

20. The method as defined in claim 19, wherein the common RFID tag is within the first set of RFID tags and the second set of RFID tags.

21. The method as defined in claim 19, further including generating a first device group indicative of RFID readers that can operate at the same time without respective ones of the RFID readers energizing a same RFID tag.

22. The method as defined in claim 19, further including identifying whether the first RFID reader and the second RFID reader should be prevented from operating at the same time.

23. The method as defined in claim 19, further including identifying a first set of RFID readers to operate at a first time and a second set of RFID readers to be prevented from operating at the first time.

24. The method as defined in claim 23, further including:

permitting the second set of RFID readers to operate at the second time; and preventing the first set of RFID readers from operating at the second time.

25. The method as defined in claim 23, further including calculating a duty cycle of operation for the first set of RFID readers and the second set of RFID readers based on (a) a number of sets of isolated RFID readers and (b) a threshold repeating time duration.

* * * * *